US012033312B2

(12) United States Patent
Kohler et al.

(10) Patent No.: US 12,033,312 B2
(45) Date of Patent: *Jul. 9, 2024

(54) SYSTEMS AND METHODS FOR DETERMINING DEFECTS IN PHYSICAL OBJECTS

(71) Applicant: BNSF Railway Company, Fort Worth, TX (US)

(72) Inventors: Rachel Kohler, Fort Worth, TX (US); Darrell R. Krueger, Lecompton, KS (US); Kevin Lawhon, Cleburne, TX (US); Garrett Smitley, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,981

(22) Filed: Mar. 10, 2023

(65) Prior Publication Data
US 2023/0326007 A1     Oct. 12, 2023

Related U.S. Application Data

(63) Continuation of application No. 17/194,954, filed on Mar. 8, 2021, now Pat. No. 11,620,743, which is a
(Continued)

(51) Int. Cl.
*G06T 7/00*           (2017.01)
*G06F 18/2431*        (2023.01)
(Continued)

(52) U.S. Cl.
CPC ........ *G06T 7/0004* (2013.01); *G06F 18/2431* (2023.01); *G06N 20/00* (2019.01);
(Continued)

(58) Field of Classification Search
CPC ............... G06T 7/0004; G06T 7/11; G06T 2207/20132; G06T 2207/30204;
(Continued)

(56) References Cited

U.S. PATENT DOCUMENTS 17,911 A    7/1857  White
70,283 A   10/1867  Staley
(Continued)

FOREIGN PATENT DOCUMENTS

CN    202533046 U    11/2012
EP     1236634 A1     9/2002
(Continued)

OTHER PUBLICATIONS

Faghih-Roohi, S. et al., Deep convolutional neural networks for detection of rail surface defects, 2016 International Joint Conference on Neural Networks (IJCNN), 2016, pp. 2584-2589, DOI: 10.1109/IJCNN.2016.7727522.
(Continued)

*Primary Examiner* — Ali Bayat
(74) *Attorney, Agent, or Firm* — Whitaker Chalk Swindle & Schwartz, PLLC; Enrique Sanchez, Jr.; Bradley J. Birchfield

(57) ABSTRACT

In one embodiment, a method includes receiving, by a defect detector module, an image of a physical object and classifying, by the defect detector module, one or more first features from the image of the physical object into one or more first classifications using one or more machine learning algorithms. The method further includes analyzing, by the defect detector module, the one or more first classifications and determining, by the defect detector module, that the physical object comprises a defect based on analyzing the one or more first classifications.

16 Claims, 7 Drawing Sheets

Related U.S. Application Data continuation of application No. 16/196,990, filed on Nov. 20, 2018, now Pat. No. 10,984,521.

(51) Int. Cl.

| | | |
|---|---|---|
| *G06N 20/00* | (2019.01) | |
| *G06T 7/11* | (2017.01) | |
| *G06V 10/764* | (2022.01) | |
| *G06V 10/82* | (2022.01) | |

(52) U.S. Cl.
CPC .............. *G06T 7/11* (2017.01); *G06V 10/764* (2022.01); *G06V 10/82* (2022.01); *G06T 2207/20132* (2013.01)

(58) Field of Classification Search
CPC ............. G06T 2207/30252; G06T 7/80; G06F 18/2431; G06N 20/00; G06V 10/225; G06V 2201/06
USPC .......................................................... 382/141
See application file for complete search history.

(56) References Cited

U.S. PATENT DOCUMENTS

| | | | |
|---|---|---|---|
| 88,891 A | 4/1869 | McMahen | |
| 122,569 A | 1/1872 | Chute | |
| 140,509 A | 7/1873 | Knox | |
| 171,704 A | 1/1876 | Swinburn | |
| 196,456 A | 10/1877 | Howard | |
| 304,083 A | 8/1884 | Edison | |
| 4,558,379 A | 12/1985 | Hutter et al. | |
| 5,068,912 A | 11/1991 | Concannon et al. | |
| 7,036,232 B2 | 5/2006 | Casagrande | |
| 7,200,259 B1 | 4/2007 | Gold | |
| 7,403,296 B2 | 7/2008 | Farritor et al. | |
| 7,616,329 B2* | 11/2009 | Villar .................... | G01C 3/08 356/625 |
| 7,755,660 B2* | 7/2010 | Nejikovsky ........... | B61L 23/042 348/148 |
| 7,755,774 B2 | 7/2010 | Farritor et al. | |
| 7,860,640 B1 | 12/2010 | Wall, III | |
| 8,405,837 B2* | 3/2013 | Nagle ..................... | G01C 3/08 356/625 |
| 8,958,079 B2* | 2/2015 | Kainer .................. | B61L 23/045 356/625 |
| 9,441,956 B2 | 9/2016 | Kainer et al. | |
| 9,628,762 B2 | 4/2017 | Farritor | |
| 9,771,090 B2 | 9/2017 | Warta | |
| 10,009,197 B1 | 6/2018 | Magee et al. | |
| 2001/0016061 A1 | 8/2001 | Shimada | |
| 2002/0075777 A1 | 6/2002 | Kuwaoka | |
| 2002/0186916 A1 | 12/2002 | Bessios | |
| 2005/0002558 A1 | 1/2005 | Franke et al. | |
| 2008/0086258 A1 | 4/2008 | Wall | |
| 2012/0300060 A1 | 11/2012 | Farritor | |
| 2013/0190981 A1 | 7/2013 | Dolinar et al. | |
| 2013/0270899 A1 | 10/2013 | Buttolo et al. | |
| 2014/0263652 A1 | 9/2014 | Auger | |
| 2015/0254853 A1 | 9/2015 | Tanaka et al. | |
| 2015/0271201 A1 | 9/2015 | Ruvio | |
| 2016/0104061 A1 | 4/2016 | Mcgill | |
| 2016/0231253 A1 | 8/2016 | Nygaard | |
| 2017/0061623 A1 | 3/2017 | Jaehnisch et al. | |
| 2017/0106885 A1 | 4/2017 | Singh | |
| 2019/0346088 A1 | 11/2019 | Xiong et al. | |
| 2020/0019983 A1 | 1/2020 | Wang | |
| 2020/0175352 A1* | 6/2020 | Cha ......................... | G06N 3/04 |

FOREIGN PATENT DOCUMENTS

| | | |
|---|---|---|
| GB | 2368400 A | 5/2002 |
| JP | 2008520538 A | 1/2008 |
| JP | 2008505260 A | 2/2008 |
| JP | 2010139317 A | 6/2010 |
| JP | 2012026982 A | 2/2012 |
| JP | 2015178978 A | 10/2015 |
| JP | 2016109495 A | 6/2016 |
| JP | 2017187487 A | 10/2017 |
| JP | 2018005640 A | 1/2018 |
| WO | 2006004846 A2 | 1/2006 |
| WO | 2018165753 A1 | 9/2018 |

OTHER PUBLICATIONS

Nagata F. et al. "Designs Application of Deep Convolutional Neural Network for Vision-Based Defect Inspection," 2018 IEEE International Conference on Systems, Man, and Cybernetics (SMC), Oct. 7-10, 2018, pp. 1705-1710.

Papageorgiou M. et al. "Transportation Systems 1997 (TS'97)" A Proceedings volum from the 8th IFAC/IFIP/ FORS Symposium, vol. 3, Published for the International Federation of Automatic COntrol, Jun. 18, 1997, pp. 1073-7076.

Patent Cooperation Treaty, International Search Report & Written Opinion, International Application No. PCT/US2019/062145, Date of mailing Feb. 24, 2020, 15 pages.

Anonymous ("Method for Analyzing Vehicle Wheel Assembly Rotational Movement Through Eulerian Video Magnification," IP.com, May 6, 2013) (Year: 2013), 8 pages.

Li et al. ("Improvements in Axle Box Acceleration measurements for the Detection of Light Squats in Railway Infrastructure," IEEE Transactions on Industrial Electronics, vol. 62, Issue 7; Jul. 2015) (Year: 2015), 13 pages.

Chellaswamy et al. ("Optimized vehicle acceleration measurement for rail track condition monitoring, " International Conference on Computing and Communications Technologies; Date of Conference: Feb. 23-24, 2017) (Year: 2017), 7 pages.

Bonta et al. ("The Problem of Speed Measurements in the Slip-Slide Control fro Electric Railway Traction," IEEE International Conference on Automation, Quality and Testing, Robotics; Dates of Conference: May 25-28, 2006) (Year: 2006), 3 pages.

Vohra et al. "Efficient Monitoring System for Railways for Crack Detection," 2nd International Conference on I-SMAC (IoT in Social, Mobile, Analytics, and Cloud), Aug. 30-31, 2018, pp. 676-681.

Santur et al. "Random forest based diagnosis approach for rail fault inspection in railways," 2016 National Conference on Electrical, Electronics and Biomedical Engineering, Dec. 1-3, 2016, pp. 745-750.

Wang et al. "Detect the rail track flaw by estimating the camera shaking," 17th International IEEE Conference on Intelligent Transportation Systems, Oct. 8-11, 2014, pp. 879-885, Qingdao, China.

Dudley, "Means For Recording the Conditions of and Marking Railway Tracks," Aug. 2, 1887, pp. 1-19.

* cited by examiner

SYSTEMS AND METHODS FOR DETERMINING DEFECTS IN PHYSICAL OBJECTS

CROSS REFERENCE TO RELATED APPLICATIONS

The present application is a Continuation of U.S. patent application Ser. No. 17/194,954, filed Mar. 8, 2021, which is a Continuation of U.S. patent application Ser. No. 16/196,990, filed Nov. 20, 2018, the entirety of which is hereby incorporated by reference for all purposes.

TECHNICAL FIELD

This disclosure generally relates to determining defects, and more specifically to determining defects in physical objects.

BACKGROUND

Physical objects are used in various industries to perform the objectives of business. For example, railcars move freight on tracks. The railcars and tracks include a combination of a number of physical objects. Over time, the physical objects may wear, break, or otherwise have a defect, and the defect may require repair for continued, safe operation of the railcars and tracks. Typically, physical objects such as railway components are manually inspected by technicians to identify defects.

SUMMARY

According to an embodiment, a method includes receiving, by a defect detector module, an image of a physical object and classifying, by the defect detector module, one or more first features from the image of the physical object into one or more first classifications using one or more machine learning algorithms. The method further includes analyzing, by the defect detector module, the one or more first classifications and determining, by the defect detector module, that the physical object comprises a defect based on analyzing the one or more first classifications.

According to another embodiment, a system includes one or more processors and a memory storing instructions that, when executed by the one or more processors, cause the one or more processors to perform operations including receiving, by a defect detector module, an image of a physical object and classifying, by the defect detector module, one or more first features from the image of the physical object into one or more first classifications using one or more machine learning algorithms. The operations further include analyzing, by the defect detector module, the one or more first classifications and determining, by the defect detector module, that the physical object comprises a defect based on analyzing the one or more first classifications.

According to yet another embodiment, one or more computer-readable storage media embody instructions that, when executed by a processor, cause the processor to perform operations including receiving, by a defect detector module, an image of a physical object and classifying, by the defect detector module, one or more first features from the image of the physical object into one or more first classifications using one or more machine learning algorithms. The operations further include analyzing, by the defect detector module, the one or more first classifications and determining, by the defect detector module, that the physical object comprises a defect based on analyzing the one or more first classifications.

Technical advantages of certain embodiments of this disclosure may include one or more of the following. The disclosed image capturing system automatically captures images of physical objects, which eliminates or reduces manual data collection and human labor, saving time and money. The image capturing system may capture images of physical objects such as rail components from angles that may not be identified through manual inspection, which may increase accuracy in detecting defects in physical objects. The disclosed defect detector module may automatically detect defects in physical objects using machine learning algorithms, which may eliminate the manual labor of scanning through and labeling images of potential defects. The systems and methods described in this disclosure may be generalized to different transportation infrastructures, including rail, roads, and waterways.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Physical objects such as railway components are used in various industries to perform the objectives of business. Over time, the physical objects may break or have a defect, and the defect may require repair for continued, safe operation of the railcar. Typically, physical objects such as railway components are manually inspected by technicians to identify defects.

Condition and defect analysis algorithms may utilize one or more traditional computer vision techniques (e.g., region of interest analysis, filtering, thresholding, blob techniques, edge analysis, contour extraction, histogram analysis, etc.) and common asset and/or defect heuristics to automate detection of various conditions. While these techniques may be effective in very specific and consistent cases, they are often brittle under real-world conditions and may be time intensive to maintain, correct, and enhance.

The use of machine learning algorithms for image classification and segmentation tasks includes a fundamentally different approach to image analysis than traditional computational methods. Rather than algorithmically filtering, distorting, grouping, segmenting, and computing on pixel matrices, machine learning algorithms (e.g., neural networks) utilize a series of trained network layers through which an image or parts of an image pass through to make predictions about the content of the image.

Embodiments of this disclosure use deep machine learning to capture and analyze visual imagery. The disclosed systems and methods recognize physical objects (e.g., rail components) viewed from particular hardware configurations on a vehicle in motion (e.g., a vehicle moving on a rail, a vehicle moving alongside a rail, etc.) and interprets visual data based on an amount, variety, and accuracy of labeled training data that is continuously captured, pooled and weighted. The disclosed systems and methods perform the interpretation by employing trained models on the captured image data for the physical objects to gain greater accuracy and higher-level analysis of the variety of physical objects captured. The machine learning algorithms are custom-trained for each hardware configuration to achieve optimal continuous capture and analysis for each variety of physical object. The algorithms are used to classify certain features from images of the physical objects. The classifications are then used to determine defects in the physical objects.

Figure 1:
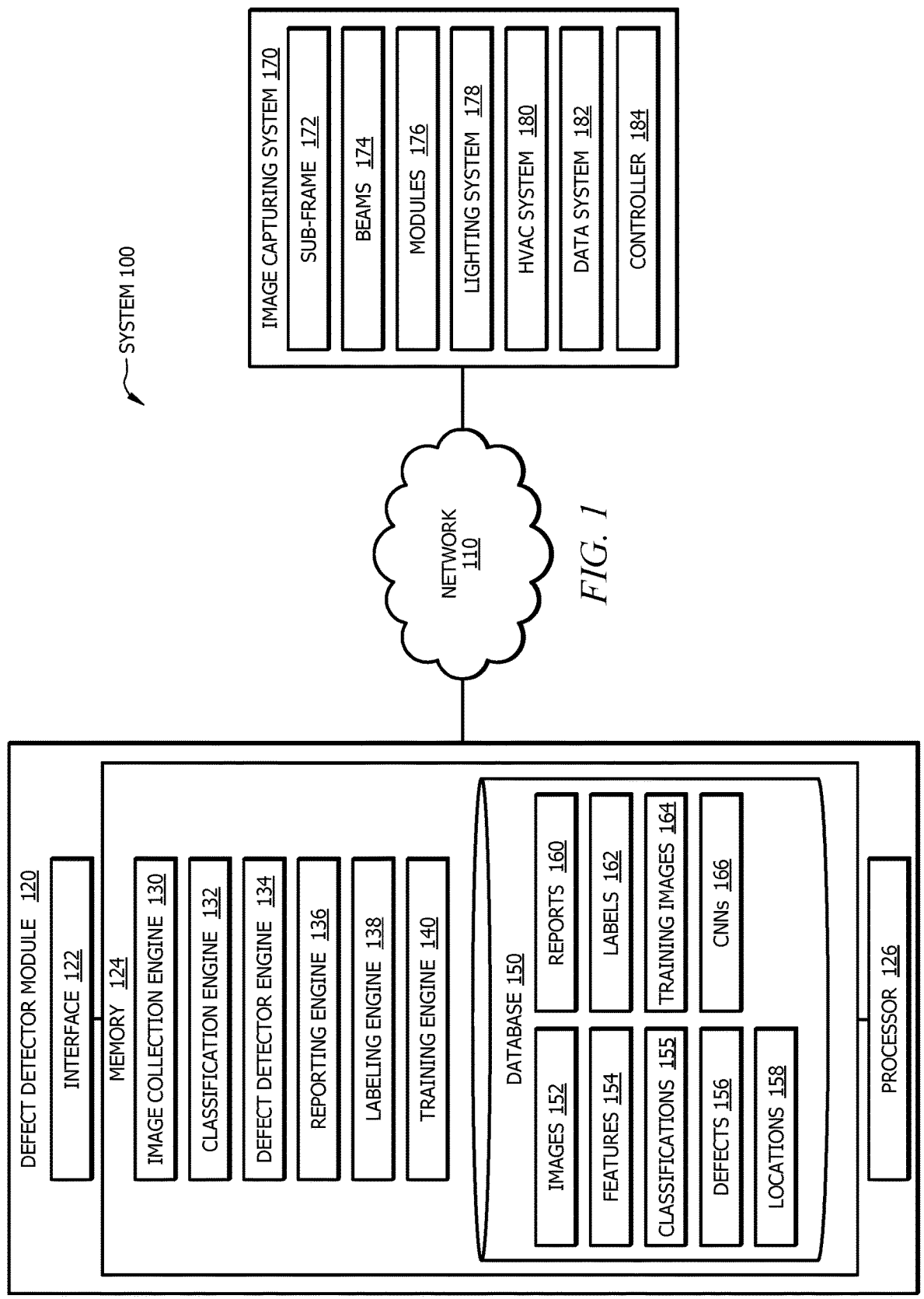
FIG. 1 illustrates an example system for determining defects in physical objects.
Figure 2:
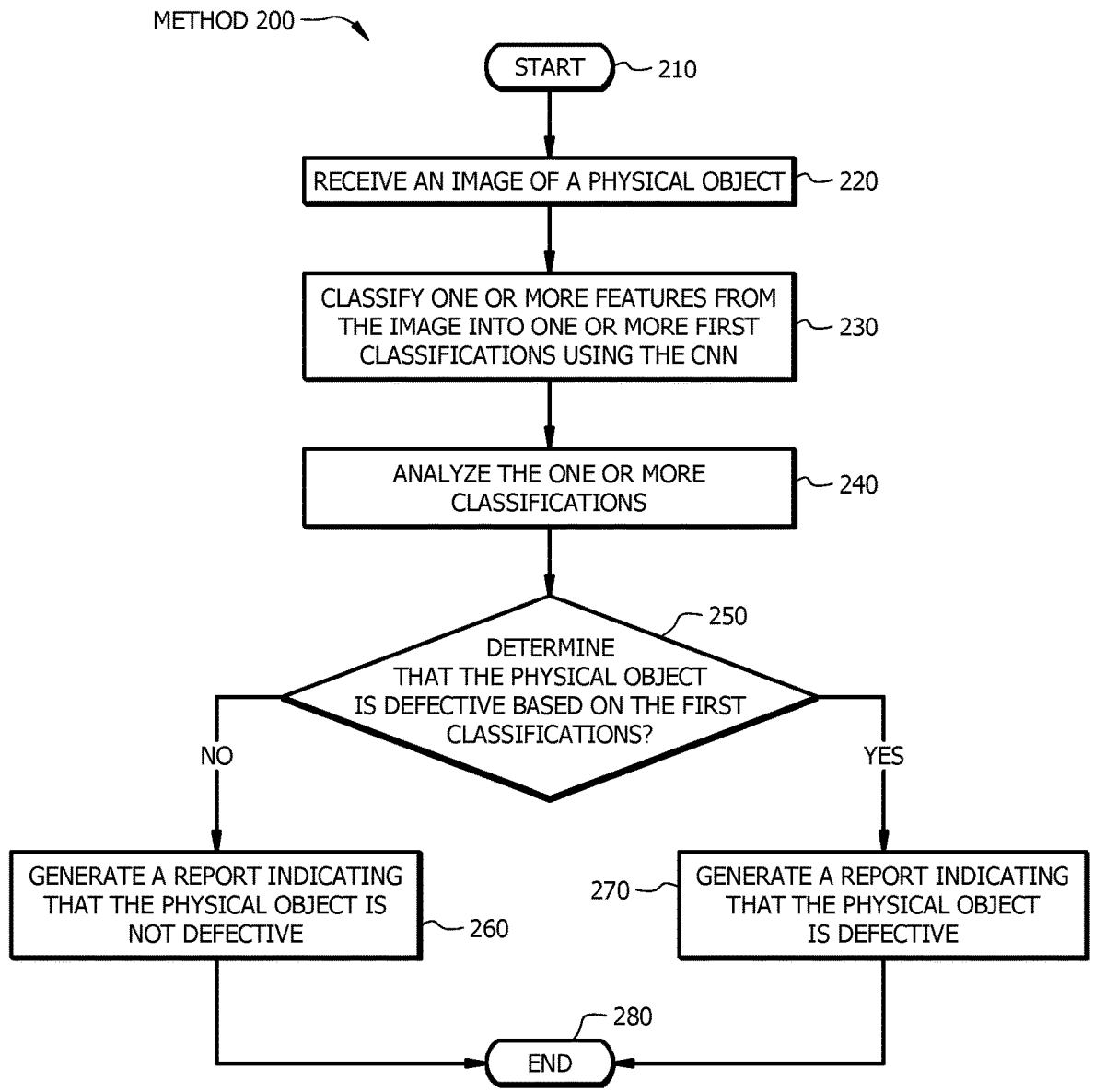
FIG. 2 illustrates an example method for determining defects m physical objects.
Figure 3:
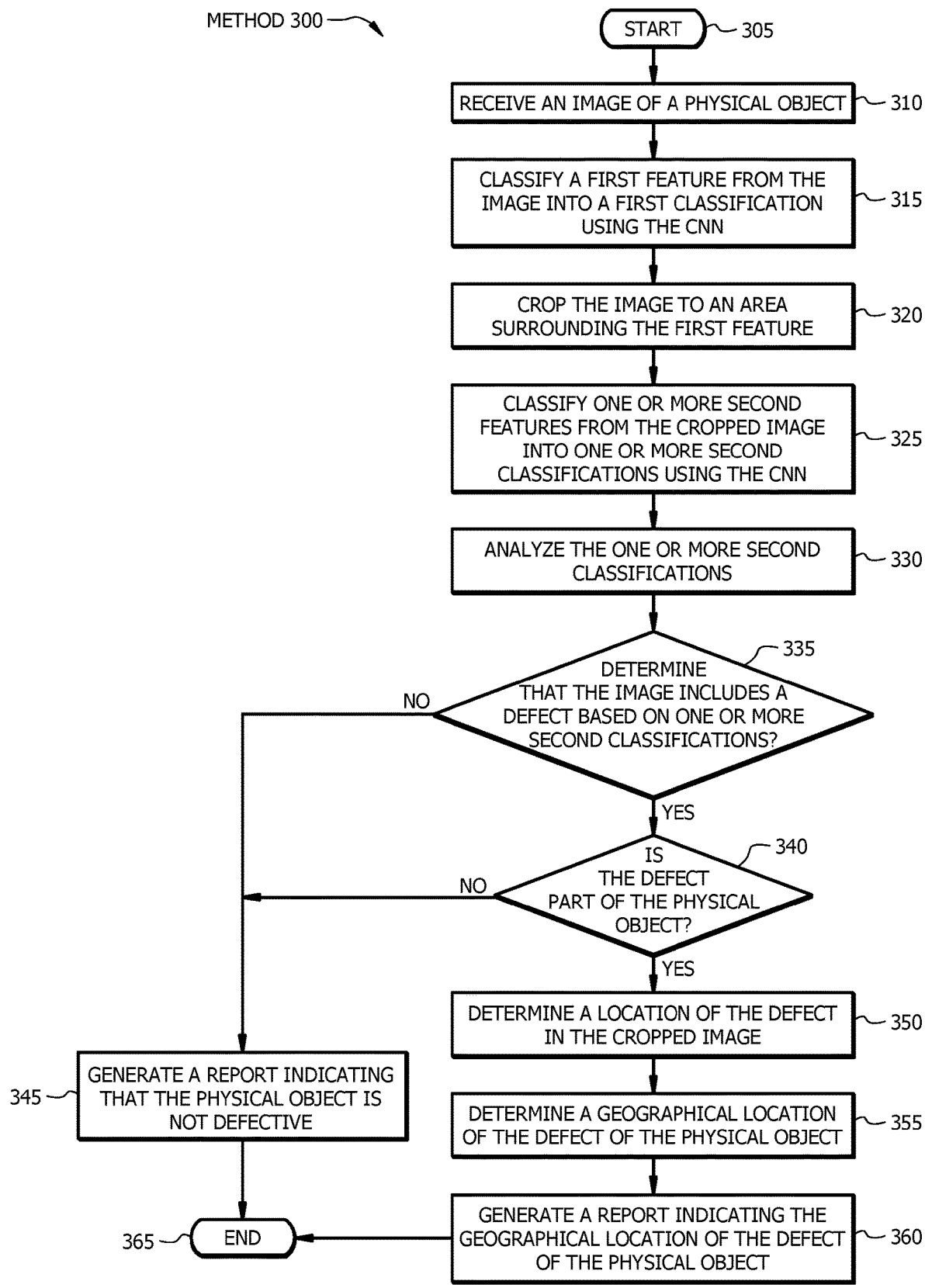
FIG. 3 illustrates another example method for determining defects in physical
Figure 4:
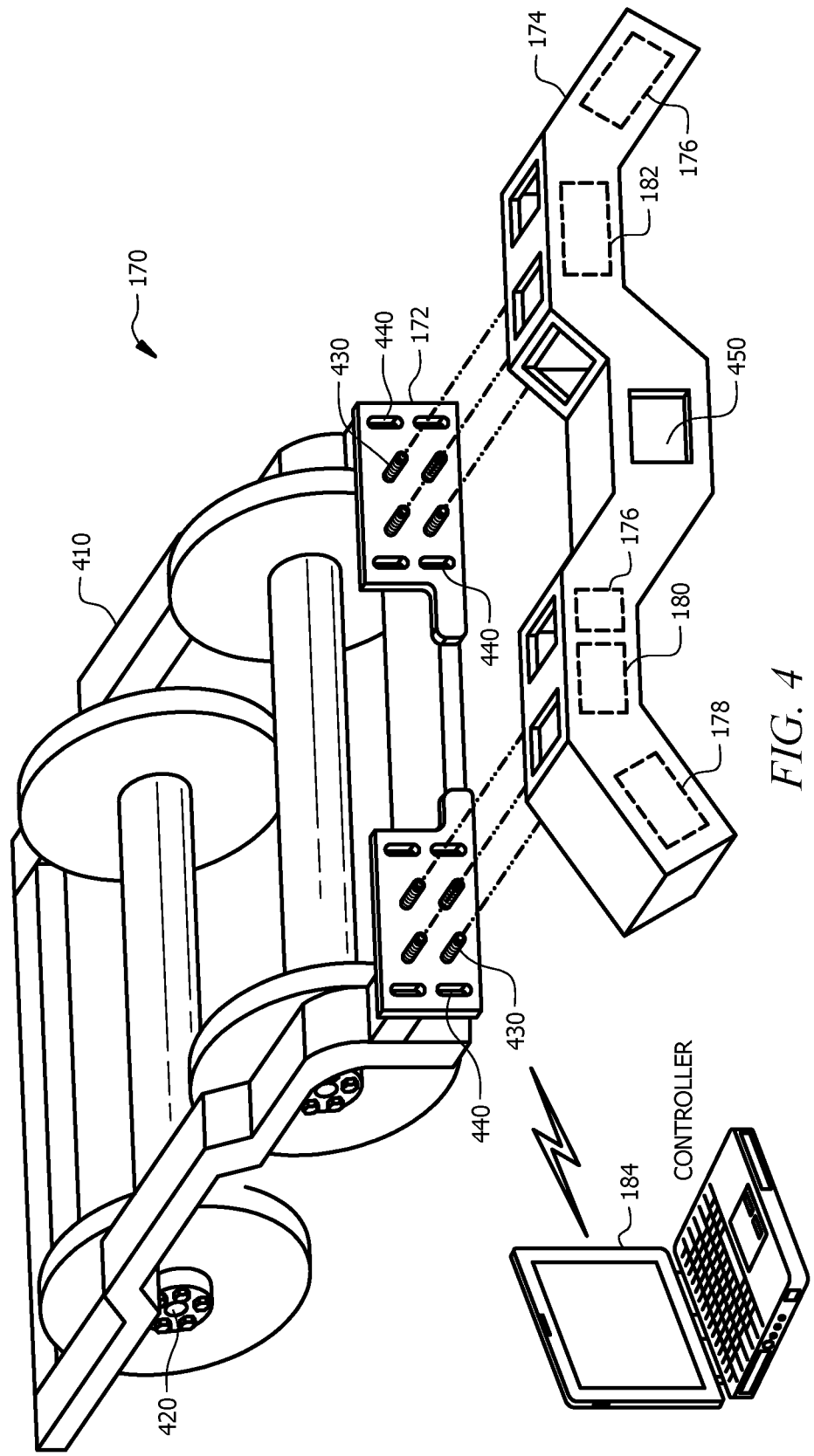
FIG. 4 illustrates an example image capturing system.
Figure 5:
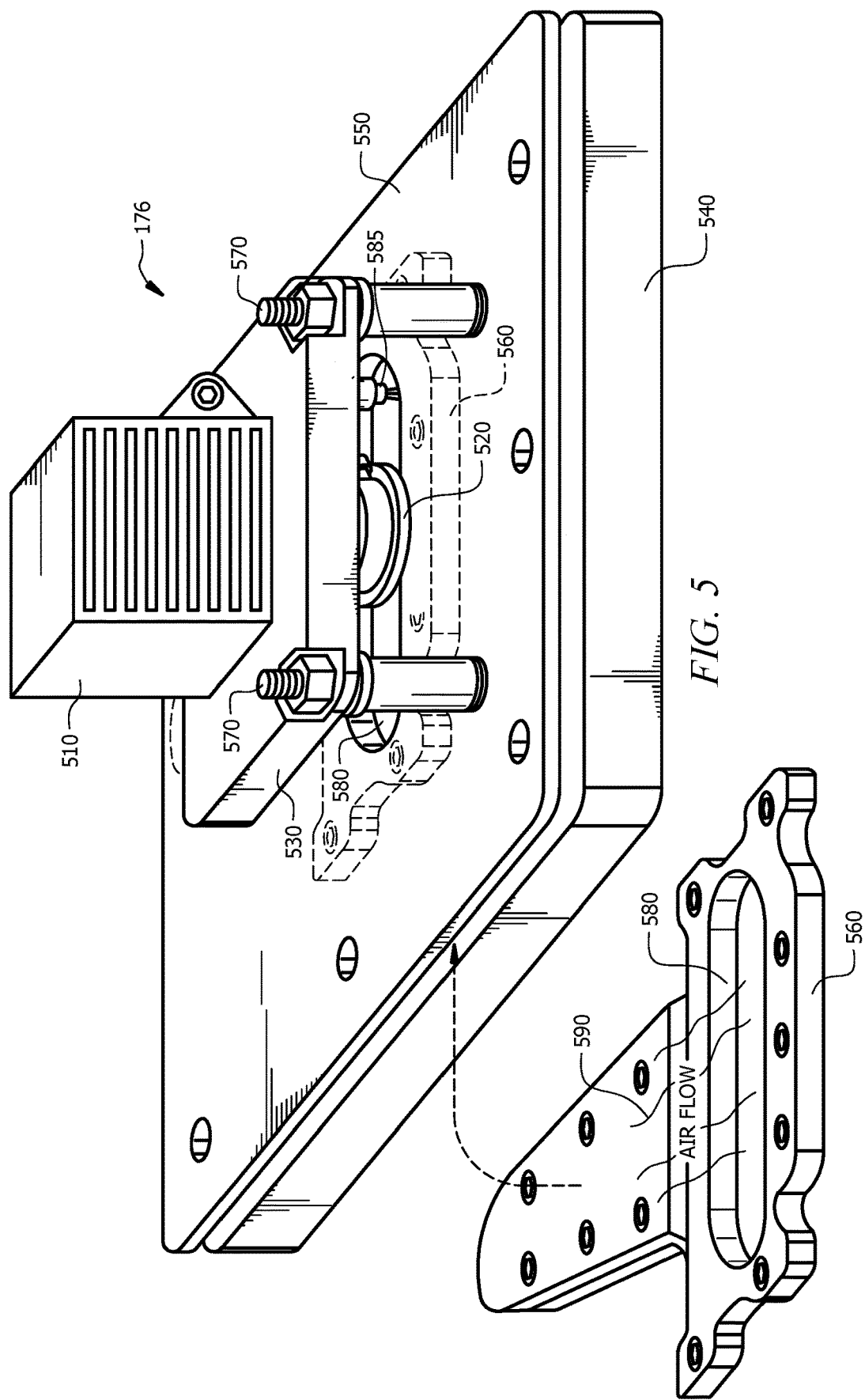
FIG. 5 illustrates an example module that may be used by the image capturing system of FIG. 4.
Figure 6:
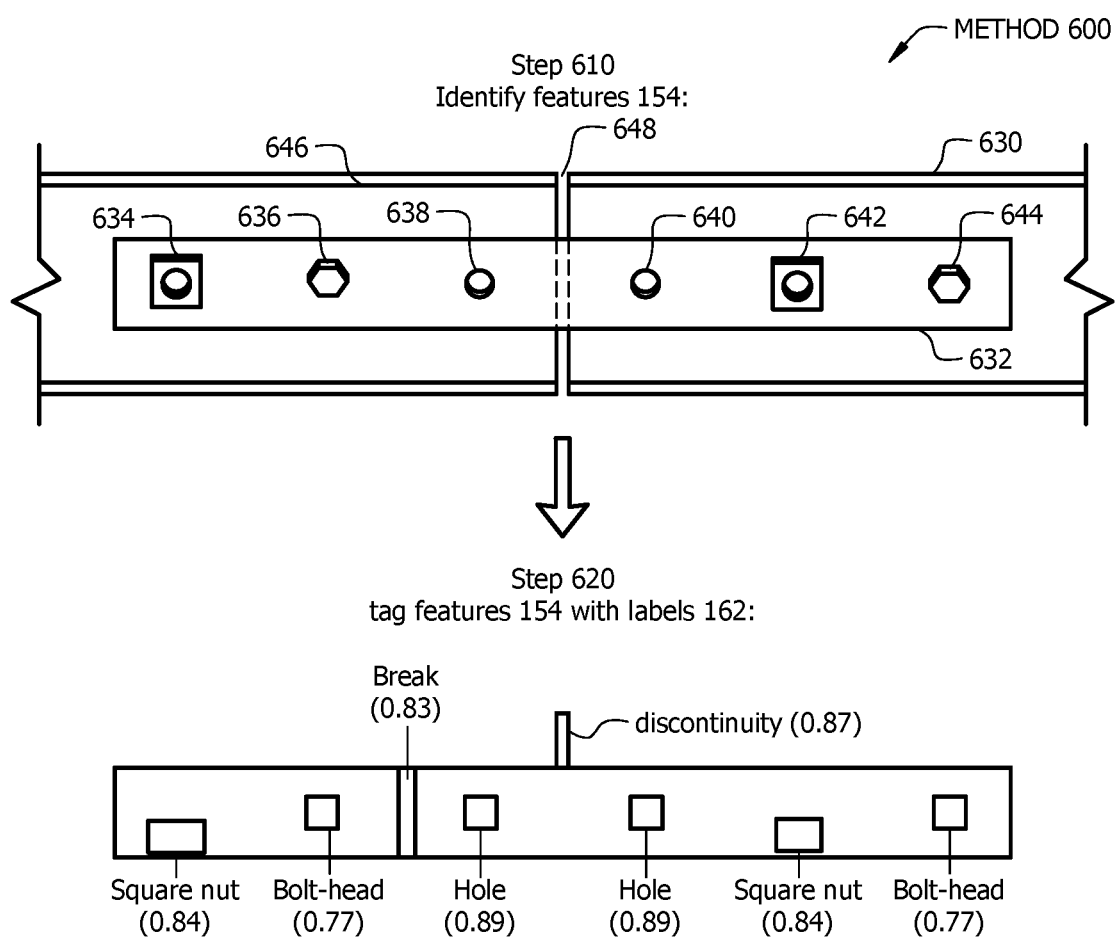
FIG. 6 illustrates an example method for tagging features with labels.
Figure 7:
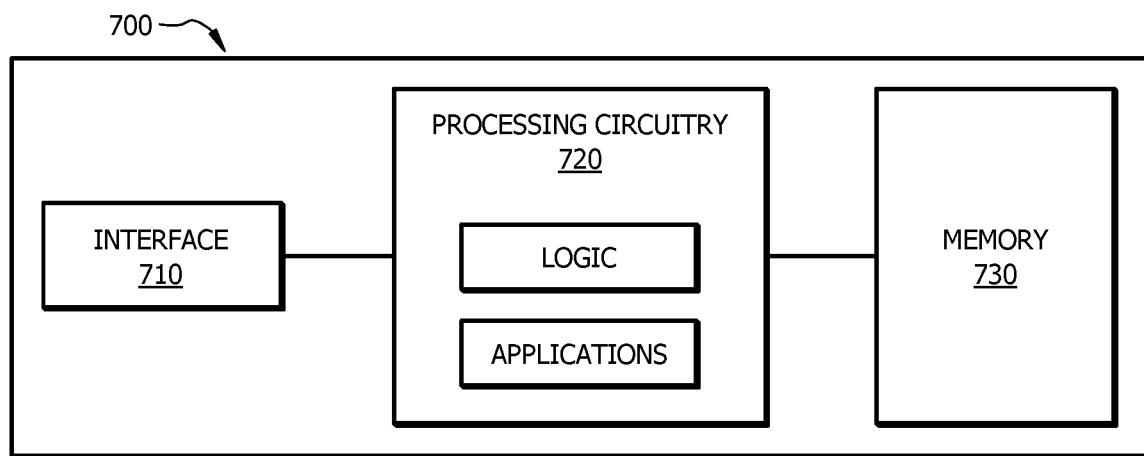
FIG. 7 illustrates an example computer system that may be used by the systems and methods described herein.

FIGS. 1 through 7 show example systems and methods for determining defects in physical objects. FIG. 1 shows an example system for determining defects in physical objects. FIGS. 2 and 3 show example methods for determining defects in physical objects. FIG. 4 shows an example image capturing system, and FIG. 5 shows an example module that may be used by the image capturing system of FIG. 4. FIG. 6 shows an example method for tagging features with labels. FIG. 7 shows an example computer system that may be used by the systems and methods described herein.

FIG. 1 illustrates an example system 100 for determining defects in physical objects. System 100 of FIG. 1 includes a network 110, a defect detector module 120, and an image capturing system 170. System 100 or portions thereof may be associated with an entity, which may include any entity, such as a business, company (e.g., a railway company, a transportation company, etc.), or a government agency (e.g., a department of transportation, a department of public safety, etc.) that may determine defects in physical objects. The elements of system 100 may be implemented using any suitable combination of hardware, firmware, and software.

Network 110 may be any type of network that facilitates communication between components of system 100. Network 110 may connect defect detector module 120 and image capturing system 170 of system 100. Although this disclosure shows network 110 as being a particular kind of network, this disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of network 110 may include one or more access (e.g., mobile access), core, and/or edge networks. Network 110 may be any communications network, such as a private network, a public network, a connection through Internet, a mobile network, a WI-FI network, a Bluetooth network, etc. Network 110 may include one or more network nodes. Network nodes are connection points that can receive, create, store, and/or transmit data throughout network 110. Network 110 may include cloud computing capabilities. One or more components of system 100 may communicate over network 110. For example, defect detector module 120 may communicate over network 110, including receiving information from image capturing system 170.

Defect detector module 120 of system 100 represents any suitable computing component that may be used to determine defects 156 in physical objects. Defect 156 is an imperfection that potentially impairs the utility of the physical object. A physical object is an identifiable collection of matter. Physical objects may include transportation infrastructure components such as road, railway, airway, waterway, canal, pipeline, and terminal components. Examples of railway components include joints, switches, frogs, rail heads, anchors, fasteners, gage plates, ballasts, ties (e.g., concrete ties and wood ties), and the like.

Defect detector module 120 includes an interface 122, a memory 124, and a processor 126. Interface 122 of defect detector module 120 represents any suitable computer element that can receive information from network 110, transmit information through network 110, perform suitable processing of the information, communicate to other components (e.g., components of image capturing system 170) of system 100 of FIG. 1, or any combination of the preceding. Interface 122 represents any port or connection, real or virtual, including any suitable combination of hardware, firmware, and software, including protocol conversion and data processing capabilities, to communicate through a LAN, a WAN, or other communication system that allows system 100 of FIG. 1 to exchange information between components of system 100.

Memory 124 of defect detector module 120 stores, permanently and/or temporarily, received and transmitted information, as well as system software, control software, other software for defect detector module 120, and a variety of other information. Memory 124 may store information for execution by processor 126. Memory 124 includes any one or a combination of volatile or non-volatile local or remote devices suitable for storing information. Memory 124 may include Random Access Memory (RAM), Read-only Memory (ROM), magnetic storage devices, optical storage devices, or any other suitable information storage device or a combination of these devices. Memory 124 may include any suitable information for use in the operation of defect detector module 120. Additionally, memory 124 may be a component external to (or may be partially external to) defect detector module 120. Memory 124 may be located at any location suitable for memory 124 to communicate with defect detector module 120. Memory 124 of defect detector module 120 may store an image collection engine 130, a classification engine 132, a defect detector engine 134, a reporting engine 136, a labeling engine 138, and a training engine 140. As another example, image collection engine 130, classification engine 132, defect detector engine 134, reporting engine 136, labeling engine 138, and training engine 140 may be external to memory 124 and/or defect detector module 120.

Image collection engine 130 of defect detector module 120 is an application that collects images 152 of physical objects. Image collection engine 130 may receive one or more images 152 of one or more physical objects from image capturing system 170 via network 110. Image collection engine 130 may receive images 152 of physical objects in real-time or near real-time as the physical objects are captured by image capturing system 170. Image collection engine 130 may receive images 152 of physical objects in accordance with a schedule (e.g., every minute, hour, week, etc.). Image collection engine 130 may combine (e.g., stitch together) one or more images 152 to create combined image 152. Image collection engine 130 may group images 152 according to any suitable combination such as by physical object, by a time image 152 was captured by image capturing system 170, by a time image 152 was received by image collection engine 130, and/or by a location 158 (e.g., geographical location 158) where image 152 was captured.

Classification engine 132 of defect detector module 120 is an application that classifies features 154 from one or more images 152 of one or more physical objects into one or more classifications 155. Each feature 154 may be a characteristic of image 152. For example, feature 154 may include a railway component such as a bolt head. Feature 154 may represent the physical object itself or one or more components of the physical object. For example, first feature 154 may represent a physical object (e.g., a railway joint) and one or more second features 154 may represent components of the railway joint (e.g., bolt heads, square nuts, hex nuts, round nuts, holes, and the like.)

Classification engine 132 analyzes data from images 152 by applying one or more machine learning algorithms. Machine learning algorithms may be associated with one or more neural networks (e.g., a deep neural network), one or more deep learning algorithms, one or more convolutional neural networks (CNNs), artificial intelligence (AI), any other suitable application, or any suitable combination of the preceding. Each machine learning algorithm may be trained on labeled image data to recognize one or more features 154 from one or more images 152. One or more machine learning algorithms used by classification engine 132 are trained to recognize specific physical objects (e.g., rail components) as viewed by one or more components (e.g., one or more cameras) of image capturing system 170. For example, one or more CNNs 166 may utilize a series of convolutional, pooling, reduction and fully connected layers through which image 152 or parts of image 152 pass through to determine predictions about the content of image 152. One or more machine learning algorithms output one or more classifications 155 that describe one or more features 154 of one or more images 152 within a level of certainty. The level of certainty may depend on the number of classifications 155, the desired accuracy, the availability of sample training data for each classification 155, and the like. The level of certainty may be represented as a probability.

One or more classifications 155 are used to identify one or more features 154. For example, first classification 155 may represent first feature 154 of a railway joint and one or more second classifications 155 may represent one or more second features 154 associated with the railway joint such as bolt heads, square nuts, hex nuts, round nuts, holes, and the like. Classifications 155 may include locations of features 154 within image 152. For example, classification 155 for "bolt head" may include a location of the bolt head within image 152, which may be part of the physical object (e.g., a railway joint).

One or more classifications 155 may include one or more defects 156. Defects 156 include any attribute of a physical object that is an imperfection or deficiency. Defects 155 may include imperfections such as cracks, breaks, holes, mismatches, chips, wear, and the like. For example, defects 155 for a railway joint may include missing bolts, a break, a crack, a tie condition (e.g., a deteriorated tie), a mismatched rail, a rail end gap, rail end batter, a ballast condition (e.g., deteriorated ballast), a right sized joint bar, and the like. As another example, defects 156 for a railway switch may include a chipped point, a broken point, missing fasteners (e.g., stock rail), a skewed switch rod, a rail run at a switch point, inadequate tie spacing, inadequate rod spacing, inadequate flangeway width, and the like. Defects 156 for a railway frog may include a chipped point, a broken point, tread wear, a broken gage plate, a skewed gage plate, a missing fastener (e.g., a missing frog bolt), a missing plate, a broken guard rail, and the like.

Defects 156 for a railway head may include rail corrugation, rail spalling, rail shelling, a broken rail, and the like. Defects 156 for a railway anchor and/or fastener may include a missing anchor and/or fastener, an inadequate anchor pattern, missing clips, missing spikes, and the like. Defects 156 for a railway gage plate may include a skewed gage plate, a broken gage plate, and the like. Defects 156 for railway ballast may include insufficient ballast, dirty ballast, fouled ballast, and the like. Defects 156 for a railway concrete tie may include a broken tie, a cracked tie, a deteriorated tie, an insufficient distance between ties, and the like. Defects 156 for a railway wood tie may include a plate cut, a wheel cut, an insufficient distance between ties, a rotted tie, a hollow tie, and the like. Other defects 156 may be identified or defined based on the physical object being captured.

Defect detector engine 134 of defect detector module 120 is an application that determines whether a physical object includes one or more defects 156 based on analyzing output of the one or more machine learning algorithms (e.g., CNNs 166). For example, defect detector engine 134 may analyze one or more classifications 155 output by one or more machine learning algorithms. Defect detector engine 134 may apply one or more algorithms to the detection results (e.g., classifications 155) to determine (e.g., optically identify) one or more defects 156.

Defect detector engine 134 may analyze one or more classifications 155 to identify one or more defects 156. For example, defect detector engine 134 may determine that a physical object (e.g., a railway joint) includes defect 156 if classification 155 associated with the physical object is defect 156 (e.g., a break). Defect detector engine 134 may determine location 158 of defect 156 on the physical object relative to other features 154 of the physical object to produce additional information about defect 156. For example, defect detector engine 134 may identify a break in a joint bar based on the results of one or more machine learning algorithms including classifications 155 for "break" and "joint bar." Defect detector engine 134 may determine that the joint bar includes bolts based on classification 155 for "bolts." Defect detector engine 134 may determine location 158 of the break relative to the bolts. Defect detector engine 134 may then produce additional information about the break based on its relative location 158. For example, defect detector engine 134 may classify the break as "center broken defect" if the break is between two middle bolts. As another example, defect detector engine 134 may classify the break as "quarter broken defect" if the break is outside the two middle bolts.

Defect detector engine 134 may determine geographical location 158 of defect 156 of the physical object. Defect detector engine 134 may determine geographical location 158 using information received from image collection engine 130. Image collection engine 130 may capture information (e.g., a latitude and a longitude) representing one or more geographical locations 158 associated with one or more images 152 and transmit this information to defect detector engine 134. Defect detector engine 134 may translate the information received from image collection engine 130 into any suitable format. For example, defect detector engine 134 may translate a latitude and longitude received from image collection engine 130 into a track type, a track number, a line segment, milepost information, and the like. Defect detector engine 134 may use one or more algorithms (e.g., a closest point algorithm) to locate geographical location 158 on a map (e.g., an existing map of a railroad track).

In certain embodiments, defect detector engine 134 may detect welds (e.g., thermite welds) in images 152 of rails and use the weld locations to identify mileposts. Each image 152 may be "n" feet (e.g., five feet) in width, representing "n" feet (e.g., five feet) of rail, where n represents any suitable number. Defect detector engine 134 may determine geographical location 158 of the physical object by determining the footage from image 152 of the physical object relative to a milepost. Defect detector engine 134 may determine geographical location 158 of the physical object by footage from the physical object in an ascending and/or descending milepost direction. For example, defect detector engine 134 may determine that the physical object is a certain number of feet (e.g., 1000 feet) past mile post 100, which may be represented (e.g., output) as "MP 100.0+1000 Feet." As another example, defect detector engine 134 may determine that the physical object is a certain number of feet (e.g., 1000 feet) prior to mile post 137, which may be represented (e.g., output) as "MP 100.0-1000 Feet." In certain embodiments, defect detector engine 134 may represent geographical location 158 as Global Positioning System (GPS) coordinates.

Defect detector engine 134 may determine geographical location 158 based at least in part on location 158 of defect 156 relative to the physical object. For example, defect detector engine 134 may determine a geographical location 158 of a break of a rail joint based in part on location 158 of the break relative to the rail joint. Defect detector engine 134 may determine geographical location 158 based at least in part on one or more sensors (e.g., a position sensor) located within system 100 (e.g., image capturing system 170.) Geographical location 158 may be defined by coordinates (e.g., longitude and latitude.)

Defect detector engine 134 may also determine an identification mark of the physical object. The identification mark of the physical object may include any characters (e.g., numbers, letters, etc.) suitable to identify the physical object. The identification mark of the physical object may identify an owner and/or a manufacturer of the physical object (e.g., a railroad manufacturer). The identification mark of the physical object may be used to trace the physical object to its origin. For example, the identification mark may include a batch code that allows the physical object to be traced back to a specific manufacturing batch. Defect detector engine 134 may determine an identification mark of the physical object based on geographical location 158 of the physical object and/or by analyzing one or more images 152 of the physical object.

Reporting engine 136 of defect detector module 120 is an application that generates one or more reports 160. Reporting engine 136 may generate report 160 indicating that the physical object is not defective if defect detector engine 134 determines that the physical object does not include defect 156. Reporting engine 136 may generate report 160 indicating that the physical object is defective if defect detector engine 134 determines that the physical object includes defect 156. Reports 160 may be in any suitable form (e.g., written and/or verbal) to communicate defects 156. Reports 160 may include information associated with the physical objects, features 154, classifications 155, locations 158, labels 162, and the like. For example, reports 160 may include labels 162 shown in FIG. 6, locations 158 (e.g., geographical locations 158), and/or identification marks. Reports 160 may include one or more diagrams, tables, lists, graphs, and/or any other suitable format for communicating information. Reporting engine 136 may communicate reports 160 to one or more components of system 100 (e.g., image capturing system 170) and/or a user (e.g., an administrator, a technician, etc.) of system 100.

Labeling engine 138 of defect detector module 120 is an application that generates one or more labels 162. Labels 162 provide visual information associated with features 154, classifications 155, defects 156, and/or locations 158. Labeling engine 138 tags features 154 of one or more physical objects with labels 162. Each label 162 may include information associated with the physical object. Each label 162 may include features 154, probabilities, sizes (e.g., diameters, areas, and the like) associated with features 154, classifications 155, locations 158, and the like. For example, label 162 may represent feature 154 as "Bolt-head (0.77)" to describe classification 155 of "bolt-head" and a probability of 0.77 (i.e., 77 percent) that feature 154 is accurately identified as a bolt head.

Labeling engine 138 may insert one or more portions of label 162 representative of feature 154 of a physical object (e.g., a rail joint) on a diagram of the physical object. Labeling engine 138 may insert one or more portions of label 162 on the diagram at location 158 that associated feature 154 occurs on the physical object. For example, for feature 154 of a bolt head, labeling engine 138 may insert one or more portions of label 162 on a diagram of the physical object at location 158 where the bolt head is positioned on the physical object. Labels 162 may represent features 154 with any suitable shape or character. For example, label 162 representative of feature 154 of a bolt head may be a bounding box having a square or rectangular shape. Defect detector engine 134 may use labels 162 to further classify defects 156, as described in FIG. 6 below.

Training engine 140 of defect detector module 120 is an application that trains one or more machine learning algorithms (e.g., CNNs 166). Training engine 140 trains machine learning algorithms using training data (e.g., training images 164) by which weights may be adjusted to accurately recognize a physical object. Machine learning algorithms may be trained on each of the specific camera angles of image capturing system 170 to provide the highest accuracy for each classification 155. Training engine 140 may train one or more machine learning algorithms by collecting sample data (e.g., training images 164) representative of each classification 155. Training engine 140 may label the sample data with labels 162 and use the labeled data to train one or more machine learning algorithms to recognize each classification 155. Training engine 140 may use a subset of the labeled imagery to check the accuracy of each machine learning algorithm.

Training engine 140 may receive initial training data from an administrator of system 100. The amount and variety of the training data (e.g., training images 164) utilized by one or more machine learning algorithms depends on the number of classifications 155, the desired accuracy, and the availability of sample data for each classification 155.

Memory 124 may store database 150. Database 150 may store certain types of information for defect detector module 120. For example, database 150 may store images 152, features 154, classifications 155, defects 156, locations 158, reports 160, labels 162, training images 164, and machine learning algorithms (e.g., CNNs 166). Database 150 may be any one or a combination of volatile or non-volatile local or remote devices suitable for storing information. Database 150 may include RAM, ROM, magnetic storage devices, optical storage devices, or any other suitable information storage device or a combination of these devices. Database 150 may be a component external to defect detector module 120. Database 150 may be located in any location suitable for database 150 to store information for defect detector module 120. For example, database 150 may be located in a cloud environment.

Processor 126 of defect detector module 120 controls certain operations of defect detector module 120 by processing information received from interface 122 and memory 124 or otherwise accessed by processor 126. Processor 126 communicatively couples to interface 122 and memory 124. Processor 126 may include any hardware and/or software that operates to control and process information. Processor 126 may be a programmable logic device, a microcontroller, a microprocessor, any suitable processing device, or any suitable combination of the preceding. Additionally, processor 126 may be a component external to defect detector module 120. Processor 126 may be located in any location suitable for processor 126 to communicate with defect detector module 120. Processor 126 of defect detector module 120 controls the operations of image collection engine 130, classification engine 132, defect detector engine 134, reporting engine 136, labeling engine 138, and training engine 140.

One or more components of defect detector module 120 may operate in a cloud. The cloud may deliver different services (e.g., applications, servers, and storage) to defect detector module 120 through network 110. The cloud may be implemented using any suitable combination of hardware, firmware, and software. For example, the cloud may be implemented using one or more components of the computer system of FIG. 7.

Image capturing system 170 of system 100 represents a system for capturing images 152 of physical objects. Image capturing system includes a sub-frame 172, a beam 174, one or more modules 176, a lighting system 178, a heating, ventilation, and air conditioning (HVAC) system 180, a data system 182, and one or more controllers 184. The components of image capturing system 180 may be attached (e.g., physically attached) to a vehicle (e.g., a locomotive). Image capturing system 170 may capture one or more images 152 of a physical object while the vehicle is in motion relative to the physical object. For example, image capturing system 170 may be attached to a locomotive, and image capturing system 170 may capture images 152 of rail joints while the locomotive travels along a railroad track. Image capturing system 170 may operate similar to a flatbed document scanner with the exception that image capturing system 170 is in motion while capturing images 152 of stationary physical objects. Image capturing system 170 is described in more detail in FIG. 4 below.

Although FIG. 1 illustrates a particular arrangement of network 110, defect detector module 120, interface 122, memory 124, processor 126, image collection engine 130, classification engine 132, defect detector engine 134, reporting engine 136, labeling engine 138, training engine 140, database 150, and image capturing system 170, this disclosure contemplates any suitable arrangement of network 110, defect detector module 120, interface 122, memory 124, processor 126, image collection engine 130, classification engine 132, defect detector engine 134, reporting engine 136, labeling engine 138, training engine 140, database 150, and image capturing system 170. Network 110, defect detector module 120, interface 122, memory 124, processor 126, image collection engine 130, classification engine 132, defect detector engine 134, reporting engine 136, labeling engine 138, training engine 140, database 150, and image capturing system 170 may be physically or logically co-located with each other in whole or in part.

Although FIG. 1 illustrates a particular number of networks 110, defect detector modules 120, interfaces 122, memories 124, processors 126, image collection engines 130, classification engines 132, defect detector engines 134, reporting engines 136, labeling engines 138, training engines 140, databases 150, and image capturing systems 170, this disclosure contemplates any suitable number of networks 110, defect detector modules 120, interfaces 122, memories 124, processors 126, image collection engines 130, classification engines 132, defect detector engines 134, reporting engines 136, labeling engines 138, training engines 140, databases 150, and image capturing systems 170. One or more components of defect detector module 120 and/or image capturing system 170 may be implemented using one or more components of the computer system of FIG. 7.

Although FIG. 1 describes system 100 for determining defects 156 in physical objects, one or more components of system 100 may be applied to other implementations. For example, one or more components of defect detector module 120 and/or image capturing system 170 may be utilized for asset identification and/or inventory. For example, classification engine 132 of defect detector module 120 may be used to identify physical objects (e.g., rail joint bars, switches, crossings, frogs, etc.) and record inventory of identified physical objects.

In operation, image collection engine 130 of defect detector module 120 receives image 152 of a physical object (e.g., a rail joint) from image capturing system 170. Classification engine 132 of defect detector module 120 classifies features 154 (e.g., bolt, break, discontinuity, and hole) from image 152 of the physical object into classifications 155 (e.g., bolt, break, discontinuity, and hole) using one or more machine learning algorithms (e.g., CNNs 166). Defect detector engine 134 of defect detector module 120 analyzes classifications 155 and determines that the physical object includes defect 156 (e.g., break) based on the analysis. Defect detector engine 134 determines location 158 of defect 156 relative to other features 154 of the physical object using image 152. Defect detector engine 134 determines geographical location 158 of defect 156 of the physical object based at least in part on location 158 of defect 156 relative to other features 154 of the physical object. Reporting engine 136 generates report 160 indicating that the physical object includes defect 156. Report 160 includes geographical location 158 of defect 156. Labeling engine 138 labels one or more first features 154 of image 152 with one or more labels 162. Labels 162 include label 162 representing defect 156 (e.g., break) of the physical object.

As such, system 100 of FIG. 1 determines defect 156 in a physical object by capturing images 152 of the physical object, analyzing images 152, classifying features 154 from images 152 using one or more machine learning algorithms, and determining defect 156 based on classifications 155, which reduces or eliminates the need for manual inspection.

FIG. 2 shows an example method 200 for determining defects in physical objects. Method 200 begins at step 210. At step 220, a defect detector module (e.g., defect detector module 120 of FIG. 1) receives an image (e.g., image 152 of FIG. 1) of a physical object from an image capturing system (e.g., image capturing system 170 of FIG. 1). For example, an image collection engine (e.g., image collection engine 130 of FIG. 1) of the defect detector module may receive an image of a rail joint from the image capturing system. The image capturing system may be attached to a component (e.g., a locomotive), and the image capturing system may capture the image while the component is in motion relative to the physical object.

At step 230, the defect detector module classifies one or more features (e.g., features 154 of FIG. 1) from the image into one or more classifications (e.g., classifications 155 of FIG. 1) using one or more machine learning algorithms (e.g., CNNs 166 of FIG. 1). For example, a classification engine (e.g., classification engine 132) of the defect detector module may use one or more CNNs to classify features such as a square nut, a bolt head, a break, a hole, a discontinuity, and a bar into classifications that include a square nut, a bolt head, a break, a hole, a discontinuity, and a bar, respectively. One or more algorithms may logically reduce the square nut and bolt head classifications to a single bolt classification since the visual distinction between a square nut and a bolt head equates to the physical representation of a bolt.

At step 240, the defect detector module analyzes the one or more classifications. A defect detector engine (e.g., defect detector engine 134 of FIG. 1) of the defect detector module may analyze the one or more classifications to identify the presence of a defect (e.g., defect 156 of FIG. 1) in the physical object. At step 250, the defect detector module determines whether the physical object is defective based on the classifications. The defect detector engine may determine whether the physical object is defective if the one or more classifications include a defect (e.g., a break).

If the defect detector module determines that the physical object is not defective based on the classifications, method 200 advances from step 250 to step 260, where a reporting engine (e.g., reporting engine 136 of FIG. 1) generates a report indicating that the physical object is not defective. Method 200 then moves to step 280, where method 200 ends. If the defect detector module determines that the physical object is defective based on the classifications, method 200 advances from step 250 to step 270, where the reporting engine generates a report indicating that the physical object is defective. Method 200 then moves to step 280, where method 200 ends.

Modifications, additions, or omissions may be made to method 200 depicted in FIG. 2. Method 200 may include more, fewer, or other steps. For example, method 200 may include training, by a training engine (e.g., training engine 140 of FIG. 1) of a defect detector module, one or more neural networks and/or algorithms (e.g., CNNs) to correctly recognize and classify features within images. As another example, method 200 may include generating, by a labeling engine (e.g., labeling engine 138 of FIG. 1) of defect detector module, one or more labels (e.g., labels 162 of FIG. 1) representative of the one or more features. Steps may be performed in parallel or in any suitable order. While discussed as specific components completing the steps of method 200, any suitable component may perform any step of method 200.

FIG. 3 shows an example method 300 for determining defects in physical objects. Method 300 begins at step 305. At step 310, an image collection engine (e.g., image collection engine 130 of FIG. 1) of a defect detector module (e.g., defect detector module 120 of FIG. 1) receives an image (e.g., image 152 of FIG. 1) of a physical object from an image capturing system (e.g., image capturing system 170 of FIG. 1). The image collection engine of the defect detector module may detect the presence of a rail joint in the image.

At step 315, the defect detector module classifies a first feature (e.g., feature 154 of FIG. 1) from the image into a first classification (e.g., classification 155 of FIG. 1). For example, one or more CNNs may be trained to detect classifications such as "bar," "discontinuity," and "end post," and a classification engine (e.g., classification engine 132 of FIG. 1) of the defect detector module may classify a first feature of a bar as a "bar" classification using the one or more CNNs. At step 320, the defect detector module crops the image to an area surrounding the first feature. For example, the classification engine may crop the image to an area surrounding the bar of the rail joint.

At step 325, the defect detector module classifies one or more second features from the image into one or more second classifications using the one or more CNNs. For example, one or more CNNs may be trained to detect second classifications such as "bolt head," "square nut," "hex nut," "round nut," "hole," and "break," and the classification engine of the defect detector module may classify a second feature of a break as a "break" classification using the one or more CNNs.

At step 330, the defect detector module analyzes the one or more second classifications. At step 335, the defect detector module determines whether the image includes a defect (e.g., defect 156 of FIG. 1) based on analyzing the one or more second classifications. For example, a defect detector engine (e.g., defect detector engine 134 of FIG. 1) of the defect detector module may determine that the image of the physical object includes a defect (e.g., defect 156 of FIG. 1) if the one or more second classifications is a defect.

If the defect detector module determines that the image does not include a defect based on the one or more second classifications, method 300 advances from step 335 to step 345, where a reporting engine (e.g., reporting engine 136 of FIG. 1) generates a report indicating that the physical object is not defective. Method 300 then moves from step 345 to step 365, where method 300 ends.

If the defect detector module determines that the image includes a defect based on the one or more second classifications, method 300 advances from step 335 to step 340. At step 340, the defect detector module determines whether the defect is part of the physical object. For example, the defect detector engine may then determine that the physical object includes a defect if the location of the defect is part of the physical object of the image. As another example, the defect detector engine may determine that the physical object does not include a defect if the location of the defect is outside of the physical object of the image (e.g., part of a different physical object of the same image). If the defect detector module determines that the defect is not part of the physical object, method 300 advances from step 340 to step 345, where the reporting engine generates a report indicating that the physical object is not defective. Method 300 then moves from step 345 to step 365, where method 300 ends.

If the defect detector module determines that the defect is part of the physical object, method 300 advances from step 340 to step 350, where the defect detector module determines a location of the defect in the cropped image. At step 355, the defect detector module determines a geographical location (e.g., a GPS location) of the defect of the physical object using the location of the defect within the image and sensor information obtained from an image capturing system (e.g., image capturing system 170 of FIG. 1). Method 300 then advances to step 360 where the reporting engine generates a report indicating that the physical object is defective. The report may also indicate the geographical location of the defect of the physical object. Method 300 then moves from step 360 to step 365, where method 300 ends.

Modifications, additions, or omissions may be made to method 300 depicted in FIG. 3. Method 300 may include more, fewer, or other steps. For example, method 300 may include further classifying the defect (e.g., a break) of the physical object (e.g., a rail joint bar) into a more specific defect (e.g., a center broken joint bar or a quarter broken joint bar) based on a location of the defect relative to other features (e.g., bolts, holes, and discontinuities) of the physical object. Steps may be performed in parallel or in any suitable order. While discussed as specific components completing the steps of method 300, any suitable component may perform any step of method 300.

FIG. 4 shows an example image capturing system 170. Image capturing system 170 captures images (e.g., images 152 of FIG. 1) of physical objects and communicates the images to a defect detector module (e.g., defect detector module 120 of FIG. 1). Image capturing system 170 or portions thereof may be associated with an entity, which may include any entity, such as a business, company (e.g., a railway company, a transportation company, etc.), or a government agency (e.g., a department of transportation, a department of public safety, etc.) that captures images. The elements of system 100 may be implemented using any suitable combination of hardware, firmware, and software.

Image capturing system 170 of FIG. 4 includes a vehicle 410, a rotary position encoder 420, a sub-frame 172, and a beam 174. Vehicle 410 is any machine to which beam 174 may be connected. Vehicle 410 may have an engine and/or wheels. Vehicle 410 may be a car, a locomotive, a truck, a bus, an aircraft, or any other machine suitable for mobility. Vehicle 410 may operate at any speed that allows one or more components (e.g., sensors, cameras, etc.) of beam 174 to capture images. For example, vehicle 410 may be a rail bound vehicle that travels 70 miles per hour.

Rotary position encoder 420 of image capturing system 170 is a wheel encoder or other timing device used to measure axle rotation. Rotary position encoder 420 may measure the number of times an axle makes a revolution. Rotary position encoder 420 may be attached to an axle of vehicle 410. Rotary position encoder 420 may be physically and/or logically connected to one or more components of image capturing system 170. For example, rotary position encoder 420 may be physically and/or logically connected to one or more cameras and/or sensors of modules 176. As another example, rotary position encoder 420 may be physically and/or logically connected to controller 184.

Rotary position encoder 420 may communicate with a camera of module 176 to ensure that the camera captures images of the same perspective and proportion regardless of the speed of travel of vehicle 410. For example, rotary position encoder 420 may be synchronized with multiple cameras of beam 174 to ensure that all cameras are taking images at the same time. As another example, rotary position encoder 420 may be synchronized with a camera of beam 174 to ensure that a camera traveling with vehicle 410 at a first speed (e.g., 7 miles per hour) captures images that are the same perspective and proportion of a camera traveling with vehicle 410 at a second speed (e.g., 70 miles per hour).

Sub-frame 172 of image capturing system 170 is an intermediate structure connecting vehicle 410 to beam 174. Sub-frame 172 engages vehicle 410 at a plurality of locations. Sub-frame 172 may be connected to vehicle 410 and/or beam 174 with one or more bolts 430, welds, and/or any other suitable coupling. Slots 440 of sub-frame 172 provide level and/or height adjustments for beam 174. Slots 440 may be vertical and/or horizontal. Vertically oriented slots 440 of sub-frame 172 provide height adjustments for beam 174. Sub-frame 174 may be connected to a front end of vehicle 410, a back end of vehicle 410, a side of vehicle 410, or any other suitable location to connect vehicle 410 to beam 174. Sub-frame 172 may be made of metal (e.g., steel or aluminum), plastic, or any other material suitable to connect vehicle 410 and beam 174. In certain embodiments, sub-frame 172 may be omitted such that beam 174 attaches directly to vehicle 410.

Beam 174 of image capturing system 170 is a structure that contains and orients components (e.g., cameras and sensors) used to capture images. In certain embodiments, beam 174 operates similar to a flatbed document scanner with the exception that beam 174 is in motion while capturing images 152 of stationary physical objects. Beam 174 engages with sub-frame 172. For example, beam 174 may be bolted to sub-frame 172 with bolts 430. In the illustrated embodiment of FIG. 4, beam 174 has three sections that include two end sections and a center section. Beam 174 has a gullwing configuration such that the center section bends inward toward the center of beam 174. The gullwing configuration allows the image capturing components (e.g., sensors, cameras, etc.) of modules 176 within beam 174 to be properly oriented within with respect to the physical objects being captured. In certain embodiments, the center section of beam 174 may be omitted, and each end section is connected to sub-frame 172. Beam 174 may be made of metal (e.g., steel or aluminum), plastic, or any other material suitable for housing components of beam 174 and for attaching beam 174 to sub-frame 172.

Beam 174 may include one or more openings 450. Openings 450 may provide for the placement of modules 176 within beam 174. Openings may allow for installation, adjustment, and maintenance of modules 176. While beam 174 is illustrated in FIG. 4 as having a particular size and shape, beam 174 may have any size and shape suitable to house and orient its components (e.g., modules 176). Other factors that may contribute to the design of beam 174 include shock resistance, vibration resistance, weatherproofing considerations, durability, ease of maintenance, calibration considerations, and ease of installation.

Beam 174 includes modules 176, lighting system 178, HVAC system 180, data system 182, and controller 184. Modules 176 house components for capturing images. Each module 176 may include one or more sensors, cameras, and the like. Modules 176 are located within beam 174 and assist with positioning and supporting the image capturing components within beam 174. Modules 176 are designed to allow for serviceability and adjustment.

In certain embodiments, each end section of beam 174 houses one or more camera modules 176. For example, a first end section of beam 174 may house module 176 that includes two downward facing cameras that capture images of tie and ballast areas of a rail. The first end section of beam 174 may house the two downward facing cameras in a portion of the first end section that is substantially horizontal to the rail. The second end section of beam 174 opposite the first end section may house two modules 176 that each include two angled cameras that capture images of both sides of the rail and rail fastening system. The second end section of beam 174 may house the four angled cameras in portions of the second end section that are at an angle (e.g., a 45 degree angle) to the rail.

Modules 176 of image capturing system 170 may house various types of sensors depending on sensing and/or measuring requirements. Sensors housed by modules 176 may include optical sensors (e.g., cameras for visible light (mono and color), infrared, UltraViolet, and/or thermal), motion sensors (e.g., gyroscopes and accelerometers), light detection and ranging (LIDAR) sensors, hyperspectral sensors, GPS sensors, and the like. Optical sensors and lasers may be used together for laser triangulation to measure deflection or profile. LIDAR sensors may be used for generating three-dimensional (3D) point-cloud data. Hyperspectral sensors may be used for specific wavelength responses. An example module 176 is described in FIG. 5 below.

Lighting system 178 of image capturing system 170 provides external illumination for capturing images. Lighting system 178 provides illumination for capturing images during daylight and darkness. Lighting system 178 may provide lighting intensity sufficient to capture images of stationary physical objects while lighting system 178 travels at a predetermined speed (e.g., 70 miles per hour.) Lighting system 178 may include mechanisms for properly orienting the illumination. Lighting system 178 may include any type of lights suitable to provide adequate illumination for capturing images. Lighting system 178 may include light emitting diode (LED) lights (e.g., white LED lights, off-road racing LED lights, etc.), light bars (e.g., off-road racing LED light bars), auxiliary lights (e.g., LED auxiliary lights), infrared lighting, a combination of these, or any other suitable types of lights. Lighting system 178 may include one or more components that provide laser illumination, infrared illumination, ultraviolet illumination, or any other suitable type of illumination required by one or more components (e.g., sensors, cameras, etc.) of modules 176.

HVAC system 180 of image capturing system 170 provides heating, ventilation, and/or air conditioning to beam 174 of image capturing system 170. HVAC system 180 may regulate environmental conditions (e.g., an internal temperature, humidity, etc.) of beam 174. HVAC system 180 may monitor the environmental conditions of beam 174 to ensure that operating requirements of modules 176 of beam 174 are satisfied. For example, HVAC system 180 may provide cooling to beam 174 to ensure a tempered environment for modules 176 (e.g., cameras and sensors) to operate during hot weather. HVAC system 180 may be a traditional HVAC system that includes one or more of a condenser, an evaporator, a compressor, an expansion valve, a belt, a hose, refrigerant, and the like.

HVAC system 180 may provide cooling to beam 174 via an air-powered vortex generator. Dried, filtered, and regulated air from a main reservoir system of vehicle 410 (e.g., a locomotive) may be applied to the vortex generator. The vortex generator may apply cooled, compressed air into beam 174. The cooled air may be routed to each module 176 (e.g., one or more sensors) for direct application. The vortex generator may also operate as a humidity regulator. For example, the vortex generator may regulate humidity to approximately 50 percent. the compressed air may provide a slight positive pressure on beam 174, which may prevent external dust and/or debris from entering beam 174 through small holes.

Data system 182 of image capturing system 170 connects and directs all data (e.g., sensor data) received from one or more components of image capturing system 170 to one or more computers, one or more controllers (e.g., controller 184), and/or one or more storage devices. Data system 182 may include one or more data cables for communicating the data to the controller and/or storage device. The data cables of data system 182 may include internal cables that reside inside beam 174. The data cables of data system 182 may include external cables that reside outside beam 174. The internal and external cables may be joined by a weatherproof connector located at a wall of beam 174. One or more external cables may be routed to the one or more computers, the one or more controllers, and/or the one or more storage devices. Data cables of data system 182 provide a path for data ingress and/or egress. For example, data cables of data system 182 may trigger signal ingress from controller 184. As another example, data system 182 may communicate data to controller 184 and/or a storage device wirelessly using any suitable wireless or cellular communication protocol.

Controller 184 of image capturing system 170 represents any suitable computing component that may be used to process information for image capturing system 170. Controller 184 may coordinate one or more components of image capturing system 170. Controller 184 may receive data from modules 176, lighting system 179, HVAC system 180, data system 182, vehicle 410, and/or rotary position encoder 420. Controller 184 may monitor inputs and/or outputs of modules 176, lighting system 178, HVAC system 180, and rotary position encoder 420. Controller 184 may include a communications function that allows users (e.g., a technician) to engage image capturing system 170 directly. For example, controller 184 may be part of a computer (e.g., a laptop), and a user may access controller 184 through an interface (e.g., a screen, a graphical user interface (GUI), or a panel) of the computer. Controller 184 may communicate with one or more components of image capturing system 170 via a network (e.g., network 110 of FIG. 1). For example, controller 184 may communicate with one or more components of image capturing system 170 via an LAN and/or from a remote terminal on a WAN such as a cellular or wireless network. Controller 184 may be located inside vehicle 410.

Controller 184 may initiate adjustments to one or more components of image capturing system 170. The adjustments may be initiated automatically by controller 184 in response to one or more conditions. For example, controller 184 may instruct HVAC system 180 to provide cooling to beam 174 when a temperature inside beam 174 exceeds a predetermined value. The adjustments may be initiated locally (e.g., within vehicle 410) by a user of controller 184 (e.g., a technician using a computer that includes controller 184). The adjustments may be initiated by controller 184 remotely (e.g., via a cellular or wireless link). The adjustments may include adjusting lighting system 178 (e.g., a lighting orientation, a lighting intensity, etc.), adjusting HVAC system 180 (e.g., temperature, humidity, etc.), adjusting a camera orientation, and the like.

Controller 184 of image capturing system 170 may monitor a power status of one or more components of image capturing system 170. Controller 184 may provide power to one or more components (e.g., sensors of modules 176) of image capturing system 170. Controller 184 may engage non-data features such as remote reset. Controller 184 may receive a trigger signal from rotary position encoder 420 and distribute the signal to a controller (e.g., a sensor controller) of module 176. The controller of module 176 may then actuate one or more components of module 176 (e.g., a sensor) in real-time with the control system signal. Image capturing system 170 may include one or more motion sensing sensors, such as gyroscopes and accelerometers, that provide a trigger signal compensation factor to account for vehicle motions caused by extraneous features (e.g., a rough track).

In certain embodiments, image capturing system 170 may receive a speed of vehicle 410. Controller 184 may receive the speed (e.g., a GPS velocity signal) of from a GPS receiver, a radar speed measurement system, a laser speed measurement system, or any other suitable component operable to measure speed of vehicle 410.

Although FIG. 4 illustrates a particular arrangement of vehicle 410, rotary position encoder 420, sub-frame 172, beam 174, modules 176, lighting system 178, HVAC system 180, data system 182, and controller 184, this disclosure contemplates any suitable arrangement of vehicle 410, rotary position encoder 420, sub-frame 172, beam 174, modules 176, lighting system 178, HVAC system 180, data system 182, and controller 184. For example, lighting system 170 may be located externally to beam 174. Vehicle 410, rotary position encoder 420, sub-frame 172, beam 174, modules 176, lighting system 178, HVAC system 180, data system 182, and controller 184 may be physically or logically co-located with each other in whole or in part.

Although FIG. 4 illustrates a particular number of vehicles 410, rotary position encoders 420, sub-frames 172, beams 174, modules 176, lighting systems 178, HVAC systems 180, data systems 182, and controllers 184, this disclosure contemplates any suitable number of vehicles 410, rotary position encoders 420, sub-frames 172, beams 174, modules 176, lighting systems 178, HVAC systems 180, data systems 182, and controllers 180. For example, image capturing system 170 may include first beam 174 at a front end of vehicle 410 and second beam 174 at a rear end of vehicle 410. As another example, image capturing system 178 may include multiple controllers 184 (e.g., a controller and a sub-controller). One or more components of image capturing system 170 may be implemented using one or more components of the computer system of FIG. 7.

FIG. 5 illustrates an example module 176 that may be used by image capturing system 170 of FIG. 4. Module 176 includes a camera 510, a lens 520, a top plate 530, a base plate 540, a cover plate 550, a cleaning device 560, bolts 570, an opening 580, and air compressor 585. Camera 510 is any device that captures images (e.g., images 152 of FIG. 1) of physical objects. For example, camera 510 may capture images of a rail component (e.g., a rail joint, a switch, a frog, a fastener, ballast, a rail head, and/or a rail tie). In certain embodiments, camera 510 is a sensor.

One or more cameras 510 may capture images of one or more physical objects from different angles. For example, one or more cameras 510 may capture images of both rails of a railway system at any given location. Each beam (e.g., beam 174 of FIG. 4) may include multiple cameras 510. The beam may include first camera 510 aimed straight down to capture an overhead image of the physical object. The beam may include second camera 510 aimed downward and outward to capture an angled image of the physical object.

Camera 510 may be a line scan camera. A line scan camera includes a single row of pixels. Camera 510 may be a dual line scan camera. A dual line scan camera includes two rows of pixels that may be captured and/or processed simultaneously. As camera 510 moves over the physical object, camera 510 may capture images such that a complete image of the physical object can be reconstructed in software line by line. Camera 510 may have a capture rate up to 140 kilohertz. Camera 510 may have a resolution and optics to detect physical objects of at least 1/16 inches in size. In alternative embodiments, camera 510 may be an area scan camera.

Camera 510 includes lens 520 that focuses and directs incident light to a sensor of camera 510. Lens 520 may be a piece of glass or other transparent substance. Lens 520 may be made of any suitable material (e.g., steel, aluminum, glass, plastic, or a combination thereof.)

Top plate 530 and base plate 540 are structural elements used to position, support, and/or stabilize one or more components of module 176 (e.g., camera 510 or a sensor). Top plate 530 and bottom plate 540 may be made of any suitable material (e.g., steel, aluminum, plastic, glass, and the like). Top plate 530 may be connected to base plate 540 with one or more bolts 570. Bolts 570 (e.g., jack bolts) may be used to alter a pitch and/or roll orientation of camera 510. For example, bolts 570 may be used to change an effective height between top plate 530 and base plate 540. Top plate 530 and/or base plate 540 may be adjusted to reduce vibration and/or shock of module 176. Top plate 530 and/or base plate 540 may include resistive heating elements to provide a warm environment for camera 510 and lens 520 to operate during cooler weather.

Cover plate 550 is a plate that covers base plate 540. Cover plate 550 may be made of any suitable material (e.g., glass, steel, aluminum, and the like). Cover plate 550 includes an opening 580. Opening 580 may serve as an aperture through which a lens of camera 510 views the physical object. Opening 580 allows for transmission of a sensed signal from the environment to reach a sensor of camera 510. Opening 580 may be any suitable size (e.g., oval, rectangular, and the like) to accommodate views of camera 510. Lens 520 of camera 510 and/or air compressor 585 may be positioned directly over opening 580. Air compressor 585 may provide cooling to beam 174 via an air-powered vortex generator as described in FIG. 4 above.

Cleaning device 560 is any device that protects lens 520 and/or a sensor of camera 510 from the environment. Cleaning device 560 dislodges dust, small debris, water, and/or other items that may obstruct the view through opening 580. Cleaning device 560 provides minimal or no obstruction of a signal transmitted by a component (e.g., a camera or a sensor) of module 176. Cleaning device 560 may be located between cover plate 550 and based plate 540. In certain embodiments, cleaning device 560 physically connects to cover plate 550 and/or base plate 540. Cleaning device 560 may be made of any suitable material (e.g., glass, steel, aluminum, and the like). Cleaning device 560 may be located on an external face of module 176 (e.g., an underside of module 176).

Cleaning device 560 may employ any suitable method to clean lens 520 of camera 510. For example, cleaning device 560 may include a cleaning agent that emits compressed air, compressed gas, or a cleaning fluid. Cleaning device 560 may include a wiper blade, a brush, or any other suitable method to clean lens 520. In certain embodiments, the cleaning agent is a compressor (e.g., air compressor 585) that emits compressed air or compressed gas. The compressed air or compressed gas is discharged through an orifice designed to utilize the Coanda effect, which entrains nearby air into the primary stream to amplify the amount of air (see notation 590 for air flow) displaced across lens 520. In certain embodiments, cleaning device 560 may be part of an HVAC system (e.g., HVAC system 180 of FIG. 4).

Although FIG. 5 illustrates a particular arrangement of camera 510, lens 520, top plate 530, base plate 540, cover plate 550, cleaning device 560, bolts 570, opening 580, and air compressor 585, this disclosure contemplates any suitable arrangement of camera 510, lens 520, top plate 530, base plate 540, cover plate 550, cleaning device 560, bolts 570, opening 580, and air compressor 585. Although FIG. 5 illustrates a particular number of cameras 510, lenses 520, top plates 530, base plates 540, cover plates 550, cleaning devices 560, bolts 570, openings 580, and air compressors 585, this disclosure contemplates any suitable number of cameras 510, lenses 520, top plates 530, base plates 540, cover plates 550, cleaning devices 560, bolts 570, openings 580, and air compressors 585. For example, module 176 may include multiple cameras 510. One or more components of module 176 may be implemented using one or more components of the computer system of FIG. 7.

FIG. 6 illustrates an example method 600 for tagging features 154 with labels 162. FIG. 6 includes a diagram of a rail 630 and a rail joint bar 632. Method 600 begins at step 610, where a classification engine (e.g., classification engine 132 of FIG. 1) identifies features 154 of rail joint 132. Features 154 include a first square nut 634, a first bolt head 636, a first hole 638, a second hole 640, a second square nut 642, a second bolt head 636, a break 646, and a discontinuity 648. Break 646 represents a defect (e.g., defect 156 of FIG. 1) of rail joint bar 632. Discontinuity 648 represents a separation between rails 630. The classification engine may identify (e.g., classify) features 154 of rail joint 132 using one or more CNNs.

At step 620 of method 600, a labeling engine (e.g., labeling engine 138 of FIG. 1) tags features 154 of rail joint 132 with labels 162. As shown, the labeling engine tags feature 634 as "Square nut (0.84)," tags feature 636 as "Bolt-head (0.77)," tags feature 638 as "Hole (0.89)," feature 640 as "Hole (0.89)," feature 642 as "Square nut (0.84)," feature 644 as "Bolt-head (0.77)," feature 646 as "Break (0.83)," and feature 648 as "discontinuity (0.87)." Each label includes a classification (e.g., classification 155 of FIG. 1) of each feature 154 and a probability of each classification accurately identifying each feature. For example, feature 636, which is tagged as "Bolt-head (0.77)," represents a classification of "bolt-head" and a probability of 0.77 (e.g., 77 percent) that "Bolt-head" accurately identifies feature 636. As another example, feature 638, which is tagged as "Hole (0.89)," represents a classification of "hole" and a probability of 0.89 (e.g., 89 percent) that "hole" accurately identifies feature 638. As another example, feature 646, which is tagged as "Break (0.83)," represents a classification of "break" and a probability of 0.83 (e.g., 83 percent) that "break" accurately identifies feature 646. As still another example, feature 648, which is tagged as "discontinuity (0.87)," represents a classification of "discontinuity" and a probability of 0.87 (e.g., 87 percent) that "discontinuity" accurately identifies feature 648.

The classifications and/or probabilities may be determined by the classification engine using one or more machine learning networks (e.g., CNNs) and/or algorithms. In the illustrated embodiment, the location of each bounding box represents a location of each feature 154 relative to the other features 154 and relative to rail joint bar 632. Each bounding box may be any suitable quadrilateral shape (i.e., a square, a rectangle, etc.). An object detection model may be used to output the bounding boxes and labels 162 of the detected classifications. While the illustrated embodiment of FIG. 6 represents features 154 with bounding boxes, features 154 may be represented by any suitable shape and/or character.

Method 600 may be used to further classify a defect. In FIG. 6, the defect is illustrated as a "Break." One or more machine learning algorithms (e.g., CNNs 166 of FIG. 1) may be trained to recognize the illustrated classifications of square nut, bolt-head, break, hole, discontinuity, and bar. While the one or more CNNs are trained to make a visual distinction between the square nuts and the bolt heads, the visual representation of both classifications equates to the physical representation of the presence of a bolt. A defect detector engine (e.g., defect detector engine 134 of FIG. 1) may use one or more algorithms to logically reduce the square nut and bolt-head classifications to a single bolt classification. The defect detector engine may use one or more algorithms to check the relative positions (e.g., locations 158 of FIG. 1) of each of the detected objects (i.e., the bolts, the break, the holes, and the discontinuity).

The defect detector engine may use one or more algorithms to determine whether the break detected in the joint bar is a center broken or quarter broken defect using the relative positions. In the illustrated embodiment, the detected bounding box for the break is positioned between the two middle bolts (i.e., "Bolt-head (0.77)" and "Square nut (0.84)"). The defect detector engine may determine that the break is a center broken joint bar defect due to the position of the break between the two middle bolts, which indicates that the break is in close proximity to the discontinuity. In alternative embodiments, the break may be positioned outside of the two middle bolts, and the defect detector engine may determine that the break is a quarter broken joint bar due to the position of the break outside the two middle bolts.

Modifications, additions, or omissions may be made to method 600 depicted in FIG. 6. Method 600 may include more, fewer, or other steps. For example, as discussed above, method 600 may include further classifying the defect (e.g., a break) of the physical object (e.g., a rail joint bar) into a more specific defect (e.g., a center broken joint bar or a quarter broken joint bar) based on a location of the defect relative to other features (e.g., bolts, holes, and discontinuities) of the physical object. Steps may be performed in parallel or in any suitable order. While discussed as specific components completing the steps of method 600, any suitable component may perform any step of method 600.

FIG. 7 shows an example computer system that may be used by the systems and methods described herein. For example, network 110, defect detector module 120, and image capturing system 170 of FIG. 1 may include one or more interface(s) 710, processing circuitry 720, memory (ies) 730, and/or other suitable element(s). Interface 710 (e.g., interface 122 of FIG. 1) receives input, sends output, processes the input and/or output, and/or performs other suitable operation. Interface 710 may comprise hardware and/or software.

Processing circuitry 720 (e.g., processor 126 of FIG. 1) performs or manages the operations of the component. Processing circuitry 720 may include hardware and/or software. Examples of a processing circuitry include one or more computers, one or more microprocessors, one or more applications, etc. In certain embodiments, processing circuitry 720 executes logic (e.g., instructions) to perform actions (e.g., operations), such as generating output from input. The logic executed by processing circuitry 720 may be encoded in one or more tangible, non-transitory computer readable media (such as memory 730). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 730 (or memory unit) stores information. Memory 730 (e.g., memory 124 of FIG. 1) may comprise one or more non-transitory, tangible, computer-readable, and/or computer-executable storage media. Examples of memory 730 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system for determining defects in physical objects, comprising:
    an image capturing system, including a sub-frame, a beam, one or more sensors, a lighting system, a data system, and one or more controllers; and
    a defect detector module, including:
        an image collection engine configured to collect one or more images of one or more physical objects from the image capturing system;
        a classification engine configured to classify one or more features from the images into one or more classifications;
        a defect detector engine configured to analyze the one or more classifications to identify one or more defects; and
        a reporting engine configured to generate a report indicating whether the physical object is defective based on the defect detector engine analysis;
    wherein the classification engine analyzes the images via one or more machine learning algorithms; and
    wherein the one or more machine learning algorithms output the one or more classifications that describe the one or more features of the one or more images within a level of certainty.

2. The system of claim 1, wherein each machine learning algorithm is trained on labeled image data to recognize the one or more features from the one or more images.

3. The system of claim 1, wherein the one or more machine learning algorithms are trained to recognize specific physical objects as viewed by one or more components of the image capturing system.

4. The system of claim 1, wherein the level of certainty depends on the number of classifications, the desired accuracy, and the availability of sample training data for each classification.

5. The system of claim 1, wherein the level of certainty may be represented as a probability.

6. The system of claim 1, wherein a first classification represents a first feature of a railway joint.

7. The system of claim 1, wherein a second classification represents one or more second features associated with the railway joint.

8. The system of claim 1, wherein the one or more classifications include one or more railway defects.

9. The system of claim 1, wherein the defect detector engine produces additional information about the defect based on a relative location of the defect.

10. A defect detector module, including:
    an image collection engine configured to collect one or more images of one or more physical objects;
    a classification engine configured to classify one or more features from the images into one or more classifications;
    a defect detector engine configured to analyze the one or more classifications to identify one or more defects;
    a reporting engine configured to generate a report indicating whether the physical object is defective based on the defect detector engine analysis; and
    an interface configured to receive and transmit data from the classification engine, the defect detector engine, or the reporting engine;
    wherein the classification engine analyzes the images via one or more machine learning algorithms; and
    wherein the one or more machine learning algorithms output the one or more classifications that describe the one or more features of the one or more images within a level of certainty.

11. The module of claim 10, wherein each machine learning algorithm is trained on labeled image data to recognize the one or more features from the one or more images.

12. The module of claim 10, wherein the one or more machine learning algorithms are trained to recognize specific physical objects as viewed by one or more components of the image capturing system.

13. The module of claim 10, wherein the level of certainty depends on the number of classifications, the desired accuracy, and the availability of sample training data for each classification.

14. The module of claim 10, wherein a first classification represents a first feature of a railway joint.

15. The module of claim 10, wherein a second classification represents one or more second features associated with the railway joint.

16. The module of claim 10, wherein the defect detector engine produces additional information about the defect based on a relative location of the defect.

\* \* \* \* \*